United States Patent Office 3,339,072
Patented Aug. 29, 1967

3,339,072
METHOD OF TRACING IODINE USING I-129
Raymond R. Edwards, Pittsburgh, Pa., assignor to Nuclear Science and Engineering Corporation, Pittsburgh, Pa., a corporation of Delaware
No Drawing. Filed June 14, 1962, Ser. No. 202,379
13 Claims. (Cl. 250—106)

This invention relates to isotopic tracers and more particularly to a novel method of tracing the behavior of iodine and iodine-containing substances in a wide variety of chemical, physical and biological media.

It has been recognized for many years that isotopes of chemical elements provide a convenient means whereby the behavior patterns of chemical elements and compounds in various media, especially in relatively complex systems such as living organisms, can be traced and studied. For example, as early as 1913 it was suggested that traces of radium-D in lead could be used as a means of determining the solubilities of sparingly soluble lead salts. Hydrogen enriched in deuterium and nitrogen enriched in nitrogen-15 are examples of non-radioactive tracers that were extensively used prior to the discovery of nuclear fission.

After the discovery of fission and as an incident of the expanding utilization of nuclear energy in recent years, the variety and quantity of isotopes potentially useful in tracer applications have greatly increased. Moreover a relatively large proportion of the new isotopes that have become available as a result of the atomic energy program have been radioactive isotopes which are particularly well adapted to be used in tracer applications because of the ease with which they can be detected in extremely small amounts. Such artificially produced isotopes provide the scientific researcher with a powerful investigative tool and the medical researcher with a novel means for the diagnosis, and in some cases, the treatment of disease.

The isotopes potentially useful for tracer applications may be broadly classified in three groups, namely, naturally-occurring radioactive isotopes, naturally-occurring stable isotopes, and artificially-produced radioactive isotopes. Most of the naturally-occurring radioactive isotopes are characterized by extremely long half-lives and specific activities so low that they cannot be accurately detected except in the relatively small proportion of cases wherein massive quantities of the tracer can be introduced into the system. In addition there are a number of descendants of the long-lived natural radioisotopes that have a relatively high activity. However, such short-lived radioisotopes comprise only a limited number of species, and in general do not include the elements of primary interest for tracer applications.

Naturally-occurring stable isotopes, such as deuterium and nitrogen-15 mentioned above, can be introduced into a system and detected by mass spectrometric techniques or by radio-activation and measurement of the resulting induced radiation. However, the utility of such stable isotopes as tracers is severely limited by the fact that the systems into which the tracer isotope is introduced normally contain the same isotope in natural abundance, and it is not possible as a practical matter to distinguish the added isotope from that already present in the system. Most tracer-applications of current interest require the use of an artificial radioactive nuclide to achieve acceptable results.

Tracers have been used in studies of a wide variety of physical, chemical and biological systems. Thus they have been used to study the distribution and flow of water and oil in subterranean oil-bearing formations and the erosion rates of grinding wheels and machine tools, as well as the wear rates of bearing surfaces of a variety of machine parts. In the chemical field they have been used in determining the solubility of sparingly soluble substances and in studying the mechanics of catalystic reactions and of ion exchange and isotope exchange reactions.

Among the most fruitful applications of tracers are those in the biological field, and more particularly in physiological and biomedical studies of living organisms. In these fields the element iodine has been found to be especially useful as a tracer because of the ease with which it can be introduced into compounds which it is desired to study. Serum proteins, protein hormones such as insulin, enzymes and the like can be readily tagged with iodine and their in vivo behavior studied.

In addition to the naturally-occurring isotope of iodine-127, some 20 radioisotopes are known having atomic weights ranging from 119 to 139. The great majority of these radioactive species of iodine can be ruled out as tracers either on the ground that they decay too rapidly and/or that they are excessively difficult and expensive to produce. The principal iodine nuclides heretofore used in iodine tracer applications are the 8-day iodine-131 and 57-day iodine-125, since these two are the only iodine species that are both available with a sufficiently high specific activity to permit their direct detection in low concentrations and have a sufficiently long half-life to permit their incorporation in a compound to be tagged and the distribution of the tagged compound in the system to be studied.

While many important findings have been made using I-125 and I-131 as tracers, they are subject to a number of serious limitations. Because of their relatively short half-lives they cannot be used for long term studies, e.g., in applications where it is desired to trace the uptake, distribution, and metabolism of a tagged compound until the compound or a tagged disintegration product thereof is excreted from the body. Also the high level of activity of these nuclides creates a radiation hazard to those working therewith, as well as to any organism into which they may be introduced for study. In addition many of the complex compounds to be tagged are sensitive to radiation and are to some extent altered thereby. It is evident that because of the short half-lives of these nuclides and the radiation effects that they produce on compounds in which they are incorporated, neither the nuclides nor compounds tagged therewith can be stored for an extended period of time. Experimental studies must be conducted with freshly prepared materials and verification of results by successive experiments becomes difficult.

It is an object of the present invention to provide an improved method of tracing iodine in a variety of physical, chemical and biological systems. It is another object of the invention to provide a tracer method using a radionuclide which can be incorporated in a compound that will remain stable in storage for an extended period of time. It is still another object of the invention to provide a tracer method in which there is substantially no health hazard due to radiation. It is another object of the invention to provide a tracer method which permits studies to be made over a period of many months. It is a further object of the invention to provide an iodine-tracing method that permits detection of exceptionally small quantities of iodine in a system in which it is distributed. It is a still further object of the invention to provide compounds tagged with a radionuclide of iodine that have improved stability in storage. Other objects of the invention will be in part obvious and in part pointed out hereafter.

In general the objects and advantages of the present invention are achieved by employing a radionuclide such as iodine-129 as a tracer and exposing the iodine-129, after it has been distributed in the system to be studied, to a neutron flux to increase its detectability. Since I-129 has a very long half-life (16,000,000 years) and a correspondingly low radiation level, its use substantially eliminates the health hazards encountered when using I-125 and I-131. Radiation-sensitive compounds can be tagged with I-129 without fear that they will be undesirably altered thereby. Since I-129 is an artificial isotope, it can be detected in the presence of naturally-occurring I-127. It has been found that by neutron activation of the I-129 after it has been distributed in the system to be studied, a sufficient amount of activity can be induced therein to permit the detection of extremely small concentrations of this tracer element.

In accordance with the method of the invention, I-129 or a compound tagged with I-129 is introduced at a predetermined point in a chemical, physical or biological system and caused to become distributed in the system, usually by being carried in a fluid medium that flows within the system. Thereafter a sample withdrawn from the system, or if the nature of the system permits, a portion of the system itself is exposed to a thermal neutron flux to convert at least a part of the I-129 to I-130 which has a half-life of 12.6 hours. Assuming a neutron flux of $10^{14}$ cm.$^{-2}$ sec.$^{-1}$, the specific activity can be increased in this way from 0.16 microcurie to 350 millicuries per milligram of I-129, i.e., about 2,000,000-fold. The neutron flux intensity should be at least $5 \times 10^7$ cm.$^{-2}$ sec.$^{-1}$. There is no theoretical upper limit. The flux intensity used will, as a practical matter, depend upon such factors as the concentration of I-129 in the material to be measured, the sensitivity of the available measuring equipment and the accuracy desired. If a high concentration of I-129 is present, a relatively inexpensive, low-intensity neutron source may be used.

As has been previously indicated, I-129 can be detected in systems containing naturally-occurring I-127. Neutron activation of I-127 yields a 25-minute I-128 which decays so rapidly that a post-radiation cooling period of 17 hours is sufficient to reduce the I-128 activity by a factor of $10^{12}$. Thus interference between the I-128 activity and the much longer lived I-130 activity can be readily avoided. It should be noted that the neutron-induced I-128 activity provides a means whereby the ratio of I-127 to I-129 in the system can be determined.

Measurement of neutron-irradiated samples to determine the concentration of iodine-129 prior to irradiation can be carried out using well-known and well-established techniques. Usually it is desirable to purify the sample by chemical treatments to eliminate radioactive components other than iodine. If the time consumed in chemical treatment is not sufficient to eliminate radiation due to I-128, the sample is permitted to cool for a further period. The sample is then counted by detecting gamma radiation of the I-130 in a scintillation counter or beta radiation in a Geiger or proportional counter. The measured radiation can be related to the amount of I-129 in the original sample by well-established methods. In some cases the unknown sample and a material containing a known quantity of I-129 are simultaneously irradiated for the same period of time and radiation counts on the two products are compared to determine the I-129 in the unknown sample.

In cases where chemical purification is inconvenient or where it is difficult to remove extraneous radionuclides completely, the I-130 can be determined by gamma-gamma coincidence measurements. In accordance with this modification the 0.528 mev. gamma of the I-130 is counted in coincidence with either the 1.15 mev. gamma or the 0.744 mev. gamma, using separate detector-differential discriminator arrangements and taking only those pulses in which the coincidence occurs. In this way interference from background pulses and radiochemical impurities can be drastically reduced.

The method of the invention is applicable to a wide variety of physical, chemical, and biological systems, including all of those wherein I-125 and I-131 have been previously used as tracers. As indicated above, the present method is characterized by extreme sensitivity. For example, a kilogram of I-129 can be dispersed in a system and detected at dilution factors of $10^{16}$. This extreme sensitivity makes it feasible to use the present method for meteorological studies such as the transport of air in a hurricane system or the behavior of silver iodide in cloud seeding. It may also be used with advantage in hydrological studies, e.g., tracing ocean currents. Applications of the method in chemical systems include determination of the distribution of iodine between immiscible solvents at very low concentrations and rates of exchange of iodine between organic and inorganic compounds.

One important biomedical application of the present method involves tagging serum proteins with I-129 to investigate protein metabolism and degradation, blood and plasma volume, blood circulation and cardiac output. In such applications detection sensitivity can be increased approximately 100-fold by using I-129 in accordance with the present method instead of the I-131 previously used. Also the use of I-129, because of its long half-life, makes possible long term investigations of this character.

Other important biomedical applications in which the present method can be used with advantage are investigations of the biokinetics of iodinated insulin and other hormones and the distribution and functioning of iodinated enzymes. Since the ratio of I-127 to I-129 can be determined by the present method, it is especially useful in studies relating to those portions of the body such as the thyroid wherein iodine tends to concentrate. The long half-life of I-129 makes it feasible to utilize complex syntheses to prepare iodine-tagged compounds which are also labeled with other tracer elements such as carbon-14, chlorine-36, and hydrogen-3. Moreover a given compound may be tagged with both I-129 and natural iodine or with I-129 and another radionuclide of iodine. In this way separate portions of the degradation products of such compounds can be traced.

The iodine-129 may be introduced into systems of the type described above in a variety of forms, depending upon the nature of the system and the objects sought to be attained. Thus it may be used in elemental form as a solid or vapor, or in ionic form, or as a component of any inorganic or organic iodine compound. Because of its stability, compounds containing I-129 can be shipped to a remote point of use and stored for indefinitely long periods of time without deterioration and without radiation hazard.

In order to point out more fully the nature of the present invention, the following specific example is given of an illustrative embodiment of the present method, specifically, the application of the present method to the determination of the solubility of lead iodide in dilute aqueous nitric acid. In general the procedure of this example comprised preparing lead iodide ($PbI_2$) containing I-129, equilibrating the lead iodide with 0.1 N aqueous nitric acid, exposing a sample of the resulting solution to a neutron flux, and counting a purified sample of the irradiated material to determine the amount of lead iodide that dissolved in the original solution.

The I-129 used in the present example was produced by the fission process and was separated at Oak Ridge National Laboratory. It was received in the form of sodium iodide in a dilute sodium acid sulfite solution having a pH of 11. The solution contained 6.05 mg. of iodine per ml. and its isotopic analysis was 86.1% I-129 and 13.9% I-127.

Potassium iodide was tagged with I-129 by mixing 0.1 ml. of this I-129 solution with approximately 6 grams of potassium iodide in 100 ml. of water. Approximately 6 grams of lead acetate was added to this solution and the resulting precipitate of lead iodide (PbI$_2$) separated by filtratioin. The precipitate was washed thoroughly with three 20-ml. fractions of 0.1 N nitric acid at a temperature of 0° C. and then placed in an evaporating dish and dried at 110° C.

A portion of the lead iodide as thus prepared was equilibrated with aqueous nitric acid and a second portion was used as a reference sample. More particularly, 3.94 grams of the lead iodide was placed in a beaker, 100 ml. of 0.1 N HNO$_3$ added and the mixture stirred for thirty minutes at a temperature of 24° C.±2° C. Immediately after equilibration a sample of the liquid was removed from the beaker and filtered to remove suspended matter. A 0.100-ml. aliquot of the filtered sample containing an unknown amount of PbI$_2$ was pipetted into a clean quartz tube which was then sealed.

A reference sample was prepared from the same lot of PbI$_2$ used in the equilibration. A total of 0.110 mg. of PbI$_2$ was wrapped in aluminum foil and placed in a clean quartz tube which was then sealed. The quartz tubes containing the unknown sample and reference sample were irradiated in close proximity to each other for 72 hours at a thermal neutron flux of $7 \times 10^{-12}$ neutrons per cm.$^2$ per second.

After irradiation the quartz tubes were externally cleaned with aqua regi. The reference sample of PbI$_2$ in its aluminum foil wrapper was placed in a flask containing 6 N NaOH, and both the wrapper and sample were dissolved completely by heating. The 0.100-ml. unknown sample was also dissolved in 6 N NaOH. Both samples were diluted to 50 ml.

Duplicate aliquots of each sample were pipetted into separatory funnels containing known amounts of iodine carrier of natural isotopic abundance. The aliquots of the unknown sample, designated A and B, were 20 ml. each, and the aliquots of the reference sample, designated C and D, were 1 ml. each. Sodium hypochlorite was added to each aliquot to ensure isotopic exchange. After acidifying, sodium nitrite was added and the iodine formed was extracted into carbon tetrachloride. The carbon tetrachloride phase was shaken with dilute sodium acid sulfite to back extract the iodine as iodide. A second extraction cycle was performed. Finally the iodine was precipitated by addition of silver nitrate. The resulting silver iodide precipitates were dried and weighed, and the precipitate from each of the four aliquots was placed in a separate vial for gamma counting.

Gamma ray spectra showed that both samples were substantially pure 12.6 hr. I-130. The samples were counted using a single channel, pulse height analyzer biased at 150 kilovolts and all counts were extrapolated to the time of removal from the neutron flux.

The silver iodide precipitate from aliquot A (unknown sample) contained $3.15 \times 10^5$ counts per minute. The chemical yield, that is, the fraction of known added carrier recovered, determined by weighing the silver iodide, was 0.852. With 100% chemical yield there would therefore have been $3.70 \times 10^5$ c.p.m. Since aliquot A contained only 40% of the 50-ml. solution of irradiated material, the entire sample contained $9.26 \times 10^5$ c.p.m. of I-130. Similarly the silver iodide precipitate from aliquot B was found to contain $2.72 \times 10^5$ c.p.m., with a chemical yield of 0.781. Since a 20-ml. aliquot had been taken, the I-130 activity of the entire sample was calculated as $8.71 \times 10^5$ c.p.m. The activity of the entire unknown sample as indicated by the average of aliquots A and B was $8.99 \times 10^5$ c.p.m. Since the unknown sample was 0.100 ml. of the original equilibrated solution, the induced activity per ml. of equilibrated solution was $8.99 \times 10^6$ c.p.m.

The silver iodide precipitate from aliquot C (reference sample) contained $2.03 \times 10^4$ c.p.m. and corresponded to a chemical yield of 0.816. As this aliquot was 1/50 of the total irradiated reference sample, I-130 activity for the total sample was indicated to be $1.24 \times 10^6$ c.p.m. The silver iodide precipitate from aliquot D also gave $2.03 \times 10^4$ c.p.m. and had a chemical yield of 0.906. Thus aliquot D indicated an activity of $1.13 \times 10^6$ c.p.m. for the total sample. The average activity indicated by aliquots C and D was $1.19 \times 10^6$. The reference sample of PbI$_2$ weighed 0.110 mg., and therefore the induced activity per mg. was $1.08 \times 10^7$ c.p.m.

The amount of lead iodide that had dissolved in the original nitric acid solution was determined by comparing the counts per minute given by the unknown sample with the counts per minute given by the reference sample, the two samples having been exposed to neutron irradiation under identical conditions. As indicated above, the unknown sample contained $8.99 \times 10^6$ c.p.m. per ml. of filtrate and the reference sample contained $1.08 \times 10^7$ c.p.m. per mg. of lead iodide. The concentration of lead iodide in the original nitric acid solution is the quotient of these two values, namely, 0.831 mg./ml.

While the foregoing example illustrates the application of the present method to a relatively simple system, those skilled in the art will recognize that the method is equally applicable to more complex systems, including biological systems wherein iodine may be employed for investigative, diagnostic or therapeutic purposes. From the foregoing description and example, it should be apparent that the method of the present invention constitutes an exceptionally powerful technique for accurate tracing of iodine in complex systems and provides the numerous advantages set forth in the introductory portion of the present specification.

I claim:
1. The method of tracing iodine and iodine-containing substances in chemical, physical and biological systems which comprises the steps of introducing a quantity of iodine-129 into said system at a predetermined point therein, causing the idoine-129 to become distributed in said system, thereafter exposing the iodine-129 of at least a portion of the said system to a neutron flux to convert a part of the iodine-129 of said portion of said system to iodine-130, and measuring characteristic radiation of said iodine-130 to determine the quantity of iodine-129 in said portion of said system and thus trace the behavior of iodine and iodine-containing substances in said system.

2. A method according to claim 1 and wherein said iodine-129 is introduced into said system in elemental form.

3. A method according to claim 1 and wherein said iodine-129 is introduced into said system in the form of an iodine-containing compound.

4. A method according to claim 1 and wherein said iodine-129 is introduced into said system in ionic form.

5. The method of tracing iodine and iodine-containing substances in chemical, physical and biological systems which comprises the steps of introducing a quantity of iodine-129 into said system at a predetermined point therein, causing the idoine-129 to become distributed in said system, thereafter withdrawing a sample from said system, exposing said sample to a neutron flux to convert a part of the iodine-129 thereof to iodine-130, and measuring characteristic radiation of said iodine-130 to determine the quantity of iodine-129 in said sample and thus trace the behavior of iodine and iodine-containing substances in said system.

6. The method of tracing iodine and iodine-containing substances in chemical, physical and biological systems having a fluid flowing therein which comprises the steps of introducing a quantity of iodine-129 into said system at a predetermined point therein, causing the iodine-129 to be carried by said fluid through said system, removing a sample of said fluid from said system at a point remote from said predetermined point, exposing said sample to a neutron flux to convert a part of the iodine-129 of said sample to iodine-130, and measuring characteristic radiation of said iodine-130 to determine the quantity of iodine-129 in said sample and thus trace the behavior of iodine and iodine-containing substances in said system.

7. The method of tracing iodine and iodine-containing substances in chemical, physical and biological systems containing naturally-occurring iodine-127 which comprises the steps of introducing a quantity of iodine-129 into said system at a predetermined point therein causing the iodine-129 to become distributed in said system, thereafter exposing at least a portion of said system to a neutron flux to convert a part of the iodine-129 and iodine-127 of said portion of said system to iodine-130 and iodine-128 respectively, and measuring characteristic radiation of said iodine-130 and iodine-128 to determine the ratio of I-129 to I-127 in said portion of said system and thus trace the behavior of iodine and iodine-containing substances in said system.

8. A method according to claim 6 and wherein the portion of said system exposed to said neutron flux is a sample withdrawn from said system.

9. The method of tracing iodine and iodine-containing substances in chemical, physical and biological systems which comprises the steps of introducing a quantity of iodine-129 into said system at a predetermined point therein, causing the iodine-129 to become distributed in said system, thereafter withdrawing a sample from said system, exposing said sample to a neutron flux to convert a part of the iodine-129 thereof to iodine-130, exposing a known quantity of iodine-129 to the same neutron flux for the same period of time to convert a portion thereof to iodine-130, measuring characteristic radiation of the iodine-130 of said sample and said irradiated known quantity of iodine-129, and comparing said two measurements to determine the concentration of iodine-129 in said sample and thus trace the behavior of iodine and iodine-containing substances in said system.

10. The method of tracing iodine and iodine-containing substances in chemical, physical and biological systems containing naturally-occurring iodine-127 which comprises the steps of introducing a quantity of iodine-129 into said system at a predetermined point therein causing the iodine-129 to become distributed in said system, thereafter exposing at least a portion of said system to a neutron flux to convert a part of the iodine-129 and iodine-127 of said portion of said system to iodine-130 and iodine-128 respectively, cooling said portion of said system to substantially eliminate radiation due to iodine-128, and measuring characteristic radiation of said iodine-130 to determine the quantity of iodine-129 in said portion of said system and thereby trace the behavior of iodine and iodine-containing substances in said system.

11. The method of tracing iodine and iodine-containing substances in chemical, physical and biological systems which comprises the steps of introducing a quantity of iodine-129 into said system at a predetermined point therein, causing the iodine-129 to become distributed in said system, thereafter exposing the iodine-129 of at least a portion of the said system to a neutron flux to convert a part of the iodine-129 of said portion of said system to iodine-130, and simultaneously measuring a plurality of characteristic radiations of said iodine-130 to determine the quantity of iodine-129 in said portion of said system and thus trace the behavior of iodine and iodine-containing substances in said system.

12. An iodinated organic compound in which at least a part of the iodine is iodine-129.

13. A protein tagged with iodine-129.

References Cited

UNITED STATES PATENTS

| | | | |
|---|---|---|---|
| 3,002,091 | 9/1961 | Armstrong | 250—106 |
| 3,019,341 | 1/1962 | Monaghan | 250—106 |
| 3,070,696 | 12/1962 | McEwen | 250—83.3 |

OTHER REFERENCES

Fission Product Pilot Plant and Other Developments in the Radioisotope Program at Oak Ridge National Laboratory, by Lamb et al., International Conference on Peaceful Uses of Atomic Energy, vol. 20, pp. 38–44, United Nations Press, 1958.

Some Recent Applications of Radioactive Isotopes in Medicine, by Wood et al., Journal of Scientific Instruments, vol. 26, July 1949, pp. 249–253.

ARCHIE R. BORCHELT, *Primary Examiner.*

RALPH G. NILSON, JAMES W. LAWRENCE,
*Examiners.*